US009848003B2

(12) United States Patent
Stevens et al.

(10) Patent No.: US 9,848,003 B2
(45) Date of Patent: Dec. 19, 2017

(54) VOICE AND VIDEO WATERMARK FOR EXFILTRATION PREVENTION

(71) Applicant: Avaya Inc., Santa Clara, CA (US)

(72) Inventors: Gilman R. Stevens, Fairview, TX (US); Chandrasekhar Manchenella, Richardson, TX (US); Dragan Grebovich, Amesbury, MA (US)

(73) Assignee: Avaya Inc., Santa Clara, CA (US)

( * ) Notice: Subject to any disclaimer, the term of this patent is extended or adjusted under 35 U.S.C. 154(b) by 195 days.

(21) Appl. No.: 14/312,450

(22) Filed: Jun. 23, 2014

(65) Prior Publication Data

US 2015/0373032 A1   Dec. 24, 2015

(51) Int. Cl.
*G06F 21/16* (2013.01)
*H04L 29/06* (2006.01)
*G06F 21/85* (2013.01)

(52) U.S. Cl.
CPC .............. *H04L 63/14* (2013.01); *G06F 21/16* (2013.01); *G06F 21/85* (2013.01); *H04L 63/0245* (2013.01)

(58) Field of Classification Search
CPC ....... H04W 28/06; H04W 80/00; H04W 4/18; H04W 88/04; H04W 12/06; H04W 48/18; H04W 4/001; H04W 76/022; H04W 84/042; G07D 7/0046; G07D 7/128; G06F 21/16; G06F 2221/0748; H04L 63/0245; H04L 63/14; H04L 65/1006
USPC .............................................. 713/176; 726/10
See application file for complete search history.

(56) References Cited

U.S. PATENT DOCUMENTS

| 8,453,241 | B2 | 5/2013 | Davids et al. | |
|---|---|---|---|---|
| 8,582,766 | B2 | 11/2013 | Yan | |
| 2002/0059522 | A1* | 5/2002 | Hirano | H04N 5/913 713/193 |
| 2004/0052218 | A1* | 3/2004 | Knappe | H04M 3/42187 370/260 |

(Continued)

OTHER PUBLICATIONS vPurity®, Salare Security LLC, 2011, [Retrieved on Jul. 21, 2014], 3 pages. Retrieved from: http://salaresecurity.com/index.php?page=products.

(Continued)

*Primary Examiner* — Kambiz Zand
*Assistant Examiner* — Abiy Getachew
(74) *Attorney, Agent, or Firm* — Sheridan Ross P.C.

(57) ABSTRACT

A legitimate voice or video communication application modifies data in a communication session to produce a watermark. The watermark is a piece of information that is part of a communication session that is not readily observable, but can be verified later on. The purpose of a watermark is to verify that the communication session is a legitimate communication session and does not pose a security breach. The video or audio communication session is monitored for a watermark. In response to determining that the communication session contains the watermark, the communication session is allowed continue. In response to determining that the communication session does not contain the watermark, the communication session is identified as a potential security breach. If the communication session is identified as a potential security breach, the communication session can be dropped and a user can be notified of the potential security breach.

20 Claims, 4 Drawing Sheets

(56) References Cited

U.S. PATENT DOCUMENTS

| | | | | |
|---|---|---|---|---|
| 2005/0193205 A1* | 9/2005 | Jacobs | .................... | G06F 21/10 |
| | | | | 713/176 |
| 2010/0066804 A1* | 3/2010 | Shoemake | ............. | H04N 7/147 |
| | | | | 348/14.02 |
| 2012/0030041 A1* | 2/2012 | Wolosewicz | ....... | G06Q 30/0277 |
| | | | | 705/14.73 |
| 2012/0072731 A1* | 3/2012 | Winograd | ............... | G06F 21/10 |
| | | | | 713/176 |
| 2012/0159174 A1* | 6/2012 | Gregotski | ...... | H04N 21/234345 |
| | | | | 713/176 |
| 2013/0151856 A1* | 6/2013 | Petrovic | ............. | H04N 1/00846 |
| | | | | 713/176 |
| 2014/0310347 A1* | 10/2014 | Krishnan | ............ | H04L 65/4038 |
| | | | | 709/204 |

OTHER PUBLICATIONS

Arora et al., "Adaptive Spread Spectrum Based Watermarking of Speech," 2003, 4 pages.

Cheng et al., "Spread Spectrum Signaling for Speech Watermarking," 2000, 4 pages.

Malvar et al., "Improved Spread Spectrum: A New Modulation Technique for Robust Watermarking," IEEE Transactions on Signal Processing, 2003, vol. 51, No. 4, pp. 898-905.

Shokri et al., "Voice quality in speech watermarking using spread spectrum technique," International Conference on Computer and Communication Engineering (ICCCE), 2012, pp. 169-173. (Abstract only).

\* cited by examiner

VOICE AND VIDEO WATERMARK FOR EXFILTRATION PREVENTION

TECHNICAL FIELD

The systems and methods disclosed herein relate to computer security and in particular to the protection of secure information.

BACKGROUND

With the proliferation of computer networks that can access unsecure networks, such as the Internet, security breaches and loss of secure information has become commonplace. There are numerous examples of corporate/government sites being hacked to obtain information, such as credit card information, medial records, top secret military information, proprietary corporate information, and the like. To prevent these types of security breaches, many corporations/governments have focused on protecting security breaches by focusing on protocols associated with data security. For instance, a firewall can be administered to only allow data access using defined ports (e.g., only allowing HTTP port 80 for data access). Other techniques such as signaling encryption (TLS) and media encryption (SRTP) can also be used. These techniques make an underlying assumption that the transaction of data transfer is legitimate and authorized.

As a result, hackers have become creative in devising different ways to attack corporate/governmental security. For example, hackers have designed malware that can be used to upload secure information from a computer by disguising the upload of the secure information as a voice or video call. Since a voice or video call can last for a long duration, it is often difficult to distinguish a legitimate voice or video call from one produced by malware. This technique is often called "exfiltration", since it is the ability to pull information outside the enterprise or government entity over a legitimate use protocol and port without the enterprise or government entity knowing about it.

SUMMARY

Systems and methods are provided to solve these and other problems and disadvantages of the prior art. A legitimate voice or video communication application modifies data in a communication session to produce a watermark. The watermark is a piece of information that is part of a communication session that is not readily observable, but can be verified away from the communication session (e.g., during the communication session but after the watermark is transmitted during the communication session). The purpose of a watermark is to verify that the communication session is a legitimate communication session and does not pose a security breach. The video or audio communication session is monitored for a watermark. In response to determining that the voice or video communication session contains the watermark, the voice or video communication session is allowed continue. In response to determining that the voice or video communication session does not contain the watermark, the voice or video communication session is identified as a potential security breach. If the voice or video communication session is identified as a potential security breach, the voice or video communication session can be dropped and a user can be notified of the potential security breach.

DETAILED DESCRIPTION

Figure 1:
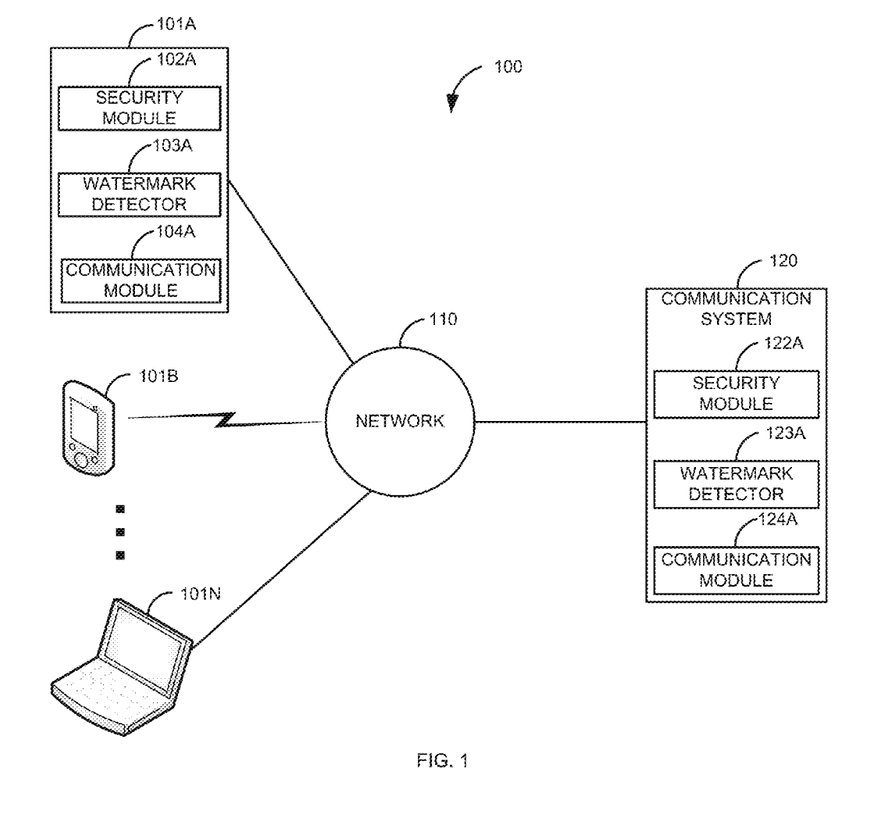
FIG. 1 is a block diagram of a first illustrative system for exfiltration prevention.

FIG. 1 is a block diagram of a first illustrative system 100 for exfiltration prevention. The first illustrative system 100 comprises communication devices 101A-101N, a network 110, and a communication system 120.

The communication devices 101A-101N can be or may include be any device that can communicate on the network 110 using voice and/or video communications, such as a Personal Computer (PC), a telephone, a video system, a cellular telephone, a Personal Digital Assistant (PDA), a tablet device, a notebook device, an audio server, a video server, a wireless device, a conferencing system, and/or the like. In addition, the communication devices 101A-101N may be directly connected to the communication system 120.

The communication device 101A is shown further comprising a security module 102A, a watermark detector 103A, and a communication module 104A. The security module 102A can be or may include any software/hardware that can manage security of a voice or video communication session using a watermark. Although not shown for simplicity, each of the other communication devices 101B-101N may also include a security module 102 (respectively referenced as 102B and 102N) that are used to manage the security of a communication session using a watermark.

The watermark detector 103A can be or may include any hardware/software capable of detecting a watermark within a voice or video communication session. Although not shown for simplicity, each of the other communication devices 101B-101N may also include the watermark detector 103 (respectively referenced as 103B and 103N).

The communication module 104A can be or may include any hardware/software that can be used to establish and maintain a communication session. For example, the communication module 104A may be a soft client for voice/video communication, a communication module in a telephone, a communication module in a video phone, a communication module in a video server, a communication module in a voice/video conferencing system, and the like. Although not shown for simplicity, each of the other communication devices 101B-101N may also include the communication module 104 (respectively referenced as 104B and 104N).

The network 110 can be or may include any network that can send and receive information, such as the Internet, a Wide Area Network (WAN), a Local Area Network (LAN), a Voice over IP (VoIP) Network, the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, video protocols, Time Division Multiplexed (TDM) protocols, Web Real Time Communication (WebRTC), CDMA, GSM, and the like. In a one embodiment, the network 110 is a secure network, such as a corporate or enterprise network that is administered in accordance with security policies of a corporation or enterprise. As compared with the Internet, the corporate or enterprise network may have one or more restrictions on content, media, communications or packets that are carried through the network.

The communication system 120 can be or may include any hardware/software that can provide communications services, such as video switch, an Private Branch Exchange (PBX), a Session Initiation Protocol (SIP) server, a video router, an audio/video conferencing bridge, a central office switch, a router, and/or the like. The communication system 120 further comprises a security module 122A, a watermark detector 123A, and a communication module 124A.

The security module 122A can be or may include any software/hardware that can manage the security of a communication session using a watermark. The security module 122A is a centralized version of the security module 102A.

The watermark detector 123A can be or may include any hardware/software that can detect a watermark within a voice or video communication session. The watermark detector 123A is a centralized version of the watermark detector 103A.

The communication module 124A can be or may include any hardware/software that can manage a communication session, such as a video switch, a PBX, a SIP server, a video router, an audio/video conferencing bridge, central office switch, a router, a session manager, and/or the like.

During a communication session between the communication device 101A and the communication device 101B, for example, the security module 102A changes data in the communication session that can be later identified as a watermark. The security module 102A can change data in the communication session (for identifying a watermark) at any point in the communication session from a first initiation message to an ending communication message.

A watermark is a piece (or multiple pieces) of information/data that can be inserted into a communication session, removed from a communication session, reorganized in the communication session, used to change a characteristic of the communication session, and/or replaced in a voice or video communication session that is not readily observable, but can be verified after the watermark has been placed into the communication session. The purpose of a watermark is to verify that the voice or video communication session is a legitimate communication session. The watermark used in a voice or video communication session is similar in many respects to a watermark used to detect counterfeit currency. For example, the United States government puts a watermark in some bills that contains small text that is not easily observable unless the bill is placed in front of a light source. When a person looks at the bill under regular conditions, the watermark is not visible. This is similar to watermarks used in communication sessions where the watermark is not easily observable. To detect the watermark, one must know what to look for. For example, a bit could be changed to a known pattern in every third packet in a media stream of a voice communication. This type of watermark is not easily observable by listening to the communication session or monitoring the communication session with a network analyzer.

The use of a watermark is clearly different from process such as general encryption, where the media stream and/or packets are completely changed during the communication session. A person monitoring the communication session can easily determine that the communication session has been encrypted. While the use of a watermark can be used within an encrypted communication session, if the communication session is decrypted, the ability to observe the watermark would still not be obvious.

The communication module 104B in the communication device 101B monitors the communication session. The watermark detector 103B in the communication device 101B determines if the communication session contains the watermark. The watermark detector 103B knows where to look for the watermark based on knowing the algorithm(s) used to insert/add/reorganize/remove data (create a watermark) in the communication session. If the communication session contains the watermark, the communication session is allowed to continue. If the communication session does not contain the watermark, the communication session is identified as a potential security threat. In this example, a user at the communication device 101B could be notified of the potential security threat and the communication session could be blocked (i.e., not initiated) and/or dropped. Alternatively, the security module 102B could notify the security module 122A

The above example describes the watermark being sent from the communication device 101A to the communication device 101B (e.g., in a peer-to-peer communication session). Likewise, the communication device 101B could also send a second watermark in the same communication session to communication device 101A for verification using the same process. The watermark that is sent from communication device 101B to the communication device 101A can be the same watermark or a different watermark. In one embodiment, the watermark is relayed back to the communication device 101A by the communication device 101B.

In one embodiment, the watermark is only sent in one direction of the communication session. If the watermark is only sent in one direction, the sending of the watermark may be based on a variety of factors, such as which communication device 101 initiated the communication session, based on the highest or lowest IP address of the communication devices 101A-101B, based on a hash of each IP address of the communication device 101A-101B, and/or the like.

In another embodiment, the monitoring of the communication session and detection of the watermark is accomplished in the communication system 120. In this embodiment, the communication session is routed through the communication system 120. During the communication session between the communication device 101A and the communication device 101B, the security module 102A changes data in the communication session that can be identified as a watermark. The communication module 124A monitors the communication session between the communication device 101A and the communication device 101B. The watermark detector 123A determines if the communication session contains the watermark. If the communication session contains the watermark, the communication session is allowed to continue. If the communication session does not contain the watermark, the communication is identified as a potential security breach. This process can also be used for a watermark sent from the communication device 101B. In addition, this process can be used for any communication sessions between the communication devices 101A-101N.

In another embodiment, one or more of the communication devices 101A-101N may not include the security module 102 or the watermark detector 103. However, depending on implementation, the security module 122A and the watermark detector 123A can be used as a proxy for the communication device 101 that does not contain the security module 102 and the watermark detector 103.

To illustrate consider the following example. Assume that the communication device 101N does not contain the security module 102 or the watermark detector 103. However, the communication device 101N is considered a secure device because malware cannot be downloaded on to the communication device 101N (i.e., the communication device 101N does not have a user an interface that allows a user to download software). The communication device 101N initiates a communication session with the communication device 101A. During the communication session between the communication device 101N and the communication device 101A, the security module 122A inserts the watermark into the communication session. The communication module 104A monitors the communication session. The watermark detector 103A detects the watermark inserted by the security module 122A and allows the communication session to continue.

The use of a watermark can be accomplished in various ways. For example, the watermark can be inserted into or can replace a protocol header of the communication session. The watermark can be inserted into a Session Initiation Protocol (SIP) header, an H.323 header, an H.264 header, an H.322 header, and/or the like. The watermark can be an inserted into the header by adding an additional field(s) or replacing a field (or portion of a field). The amount of data in the watermark may range from a single bit to a large number of bytes. The watermark may be inserted into a single header of a single packet only once during the communication session. Alternatively, the watermark may be inserted into every packet header of the communication session or only in specific packets of the communication session.

The watermark may be part of control channel (e.g., the SIP messages used to set up a voice call) and/or the watermark may be part of the media session (e.g., the Real-time Transport Protocol (RTP) of a voice stream). In one embodiment, a first watermark is used in the control channel (e.g., in a header) and a second, different watermark is used in the media stream.

In one embodiment, the watermark can be based on a number of packets sent in the communication session. For example, the watermark can be sent in the $79^{th}$ packet of a media stream. The watermark can be sent based on based on a periodic number of packets, such as in every $100^{th}$ packet. The watermark can be sent at defined packet numbers (e.g., sent in the $20^{th}$ and $200^{th}$ packets). Likewise, the watermark can be sent based on a number of packets received in the communication session.

In another embodiment, the watermark may be sent at different points (or use a different watermark) based on whether the communication session is voice or video. For example, the watermark may be sent at every $100^{th}$ packet for a voice call and at every $200^{th}$ packet for a video call. Alternatively, the watermark may be different if the call is a video call versus a voice call. Moreover, a combination of these may be used where a different watermark is sent in a different packet for voice versus video call.

In another embodiment, a size or length of one or more packets sent in the communication session is used for the watermark. For example, the watermark can be that every 100th packet will be a specific size or length (e.g., the payload (or total packet length) of every the $100^{th}$ packet will be 120 bytes). To accomplish this, the $100^{th}$ packet is reorganized (changed to a different size than it normally would have been) to match the specified length. In one embodiment, the packet size of the $100^{th}$ packet is 100 bytes, the packet size of the $200^{th}$ packet is 200 bytes, and so on. This can be reset back to 100 on the $1000^{th}$ packet and repeat again.

Alternatively, the length can be based on a defined packet number. For example, the $13^{th}$ packet of a media stream will have a size of 40 bytes including the packet headers and the $90^{th}$ packet will have a packet payload size of 90 bytes.

In another embodiment, a hash of one or more portions of the communication session can be used to change a field or portion of a field/payload. For example, a hash of a known field (e.g., an RTP header) in every $10^{th}$ packet of the media stream of a voice (or video) communication session can be used to replace the least significant two bits of the last byte in the media stream payload of the same packet. Alternatively, the header of the last previous packet could be used for the hash.

In another embodiment, a prime number mapping to a hashing algorithm for every prime number packet can be used for the watermark. For example, every prime number packet has a unique hash from a certificate. The use of prime number packets can be used in conjunction with any of the herein described processes.

In another embodiment, a timing sequence that uses a time of day, week, and/or year of the start of the communication session can be used for the watermark. For example, the watermark may be generated based on a hashing algorithm of a security certificate using the time, day, week, and/or year of the start of the communication session.

In another embodiment, a timing sequence that uses a time of day, week, and/or year of the start of the communication session can be used. This creates a timestamp that is inserted into the communication session at a defined point based on one or more of the day, the week, or the year. For example, a time of day of when the first message to initiate the communication session was received can be used to determine a packet number that contains the watermark.

In another embodiment, a second watermark can be inserted into the communication session at a defined time or packet. For example, a first watermark can be inserted on the first packet and a second, different watermark can be inserted into the $10^{th}$ packet. This process could be used where periodic watermarks are sent. For example, the first watermark could be sent in the $10^{th}$, $30^{th}$, $50^{th}$, etc., and the second watermark could be sent in the $20^{th}$, $40^{th}$, $60^{th}$, etc. packet.

In another embodiment, a second watermark can be inserted into the communication session at a defined time or packet using a unique identifier or communication session identifier. For example, the second watermark can be inserted into the communication session based on the packet number identified by the last 4 bits of the unique identifier or communication session identifier.

In another embodiment, a Media Access Control (MAC) address of a sending device can be used to create a watermark. In another embodiment, a hash of a time, a day, a week, a year of when a packet was sent can be used to create a watermark.

In another embodiment, a hash of a unique event of the communication session can be used to create a watermark. For example, an IP address of a Back-to-Back user agent inserted into the communication session can be used to generate a watermark.

In another embodiment, a hash of a time when each participant joined a conference can be used. For example, in a video conference, a hash of the time when each participant joined the conference can be used for the respective leg of the conference where the participant joined the video conference.

In another embodiment, one or more of a release date and/or a patch level associated with a communication device or software can be used to create the watermark. In another embodiment, a periodic timestamp can be inserted into the communication session as a watermark.

In another embodiment, a random pattern of watermarks can be used for each communication session. For example, using a random number generator, the process can use a specific watermark. An identifier associated with the watermark can be sent with the watermark so that the receiving entity can know which watermark is being used. Likewise, a rotating pattern of watermarks can be used with a similar process (the watermark is different for each communication session).

In another embodiment, the watermark is different based on the direction of a sent or received packet. In another embodiment, an insertion of one or more predefined signatures at different time points or at different packets sequence numbers can be used for the watermark.

In another embodiment, removing information from one or more packets in a known pattern can be used as a watermark. For example, a specific byte of a header can be removed from the packet header based on if the packet is a specific packet number and length. Likewise, a byte may be removed from a voice/video stream where the packet is a known length. The removal of a single byte will likely be unnoticeable to someone watching a video communication session or listening to a voice communication session.

In one embodiment, a Cyclic Redundancy Check (CRC) of a previously received packet can be used to create a watermark to send in the next packet in the communication session. For example, upon receiving the 10$^{th}$ packet in the media stream of the communication session, the system could do a hash of the CRC of the received packet. The hash of the CRC of the received 10$^{th}$ packet could be inserted into a Real Time Transport (RTP) header or data of the next sent packet.

In one embodiment, the watermark can be sent based on a packet retransmission. For example, if a packet is lost because of a lost acknowledgement, the communication device that resends the packet could include the watermark in the resent packet. The receiver, upon receiving two of the same packets with the same sequence number, one containing the watermark and one not containing the watermark, would verify be able to identify the watermark in the second packet.

In one embodiment, the watermark can be extended as a copyright management tool for managing a recorded communication session. By inserting a unique watermark as part of the recorded media stream, the information in the recorded communication session can be tracked. For example, if the recorded media stream is considered proprietary, the watermark can be used to enforce copyright laws in regard to unlawful copies of the recorded media stream. The watermark may also be used to identify a source of the media stream. For instance, if the communication session is a conference call, each leg of the media stream may have a unique watermark. The unique watermark may be used to identify a potential source of an illegal copy of the proprietary conference.

Figure 2:
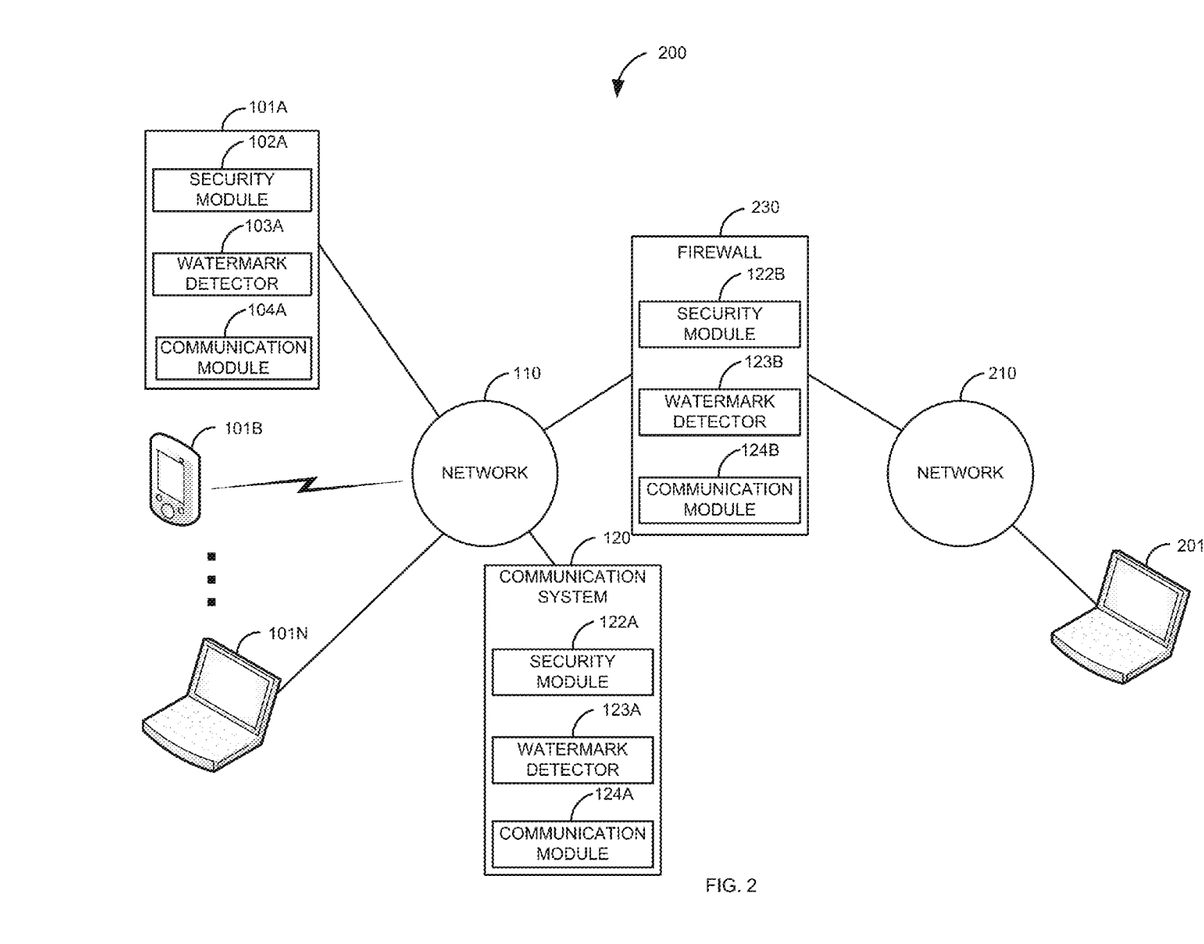
FIG. 2 is a block diagram of a second illustrative system for exfiltration prevention.

FIG. 2 is a block diagram of a second illustrative system 200 for exfiltration prevention. The second illustrative system 200 comprises the communication devices 101A-101N, the network 110, the communication system 120, a firewall 230, a network 210, and a communication device 201.

The firewall 230 can be or may include any hardware/software that provides protection services, such as a session boarder controller, a network address translator, a virus scanner, a combination of these and the like. The firewall 230 comprises a security module 122B, a watermark detector 123B, and a communication module 124B. The security module 122B can be similar to the security module 122A previously described. The watermark detector 123B can be similar to the security module 122A described previously. Likewise, the communication module 124B can be similar to the communication module 124A described previously.

The network 210 can similar to network 110. However, in one embodiment the network 110 is a secure network and the network 210 is an unsecure network, such as the Internet. The communication device 210 can be the communication device 101. However, in one embodiment, the communication device 201 is a communication device that does not include the security module 102 or the watermark detector 103. In one embodiment, the communication device 201 is an unsecure communication device.

A user at the communication device 101A initiates a communication session to communication device 201 (this may be done directly or via the communication system 120). The security module 102A inserts a watermark into the communication session. The communication module 124B monitors the communication session between the communication device 101A and the communication device 201. The watermark detector 123B determines that the communication session contains the watermark. The communication session between the communication device 101A and the communication device 201 is allowed to continue.

To illustrate the security features of the present invention, consider the case where a hacker has been able to breach security and install malware on the communication device 101A. The malware on the communication device 101A attempts to make what appears to be a voice or video call to the communication device 201 so that all the information on the communication device 101A can be uploaded to the communication device 201. The security module 122B monitors the communication session. The watermark detector 123B determines that the communication session does not contain the watermark. The security module 122B identifies the communication session as a potential security breach. The security module 122B sets an alarm and blocks the communication session. Thus, the security breach is prevented and the malware is unable to upload the information from the communication device 101A to the communication device 201.

The above process can be used where one of the communication devices 101A-101N does not include the security module 102A or the watermark detector 103. Like discussed above, the communication system 120 can act as a proxy for the communication device 101 that does not contain the security module 102 or the watermark detector 103.

The above processes have been described using packet protocols. However, in another embodiment, the information can be sent using Time Division Multiplexed (TDM) protocols. For example, a watermark can be sent in the media stream of a voice communication session over TDM.

Figure 3:
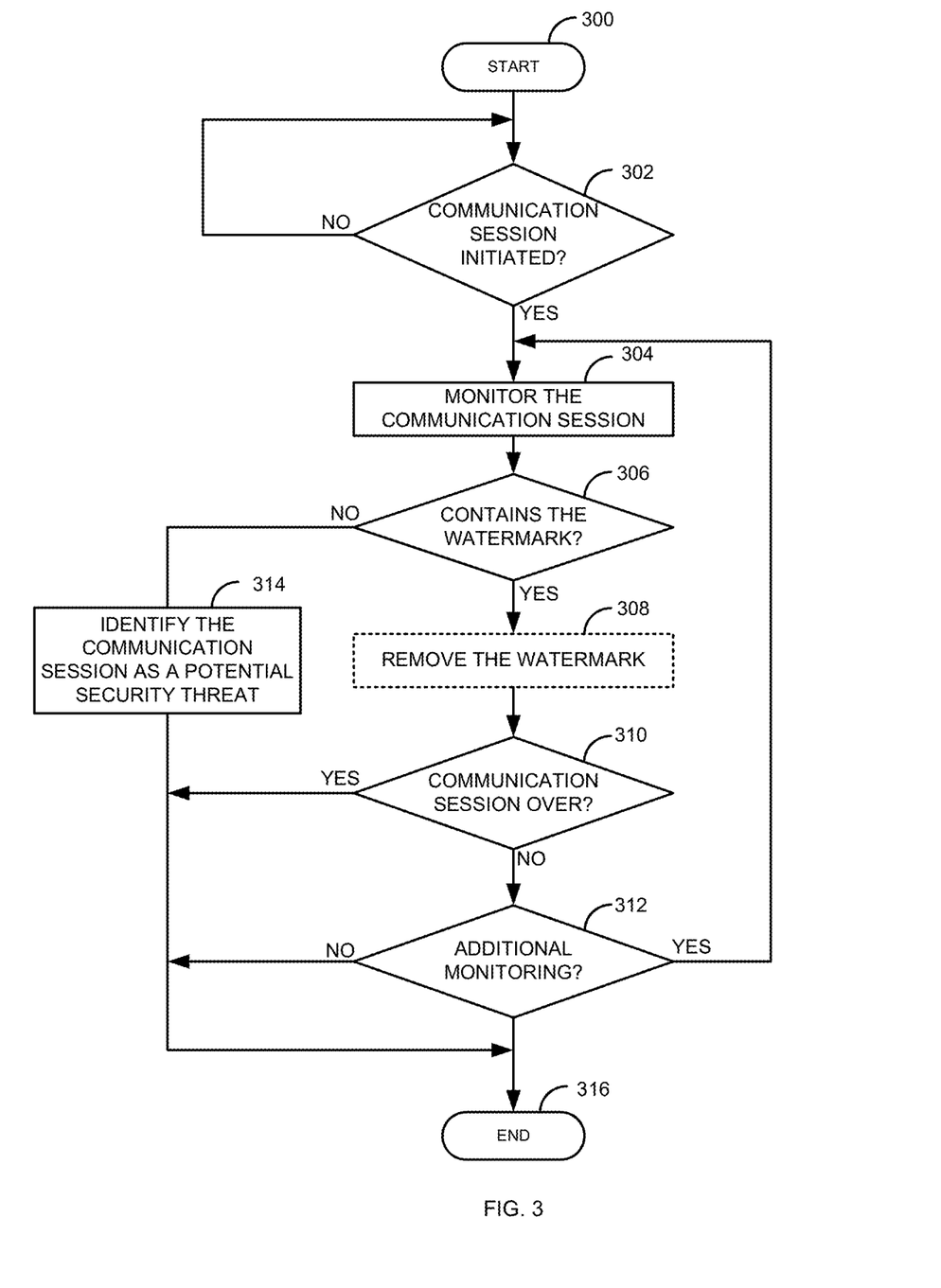
FIG. 3 is a flow diagram of a process for exfiltration prevention.
Figure 4:
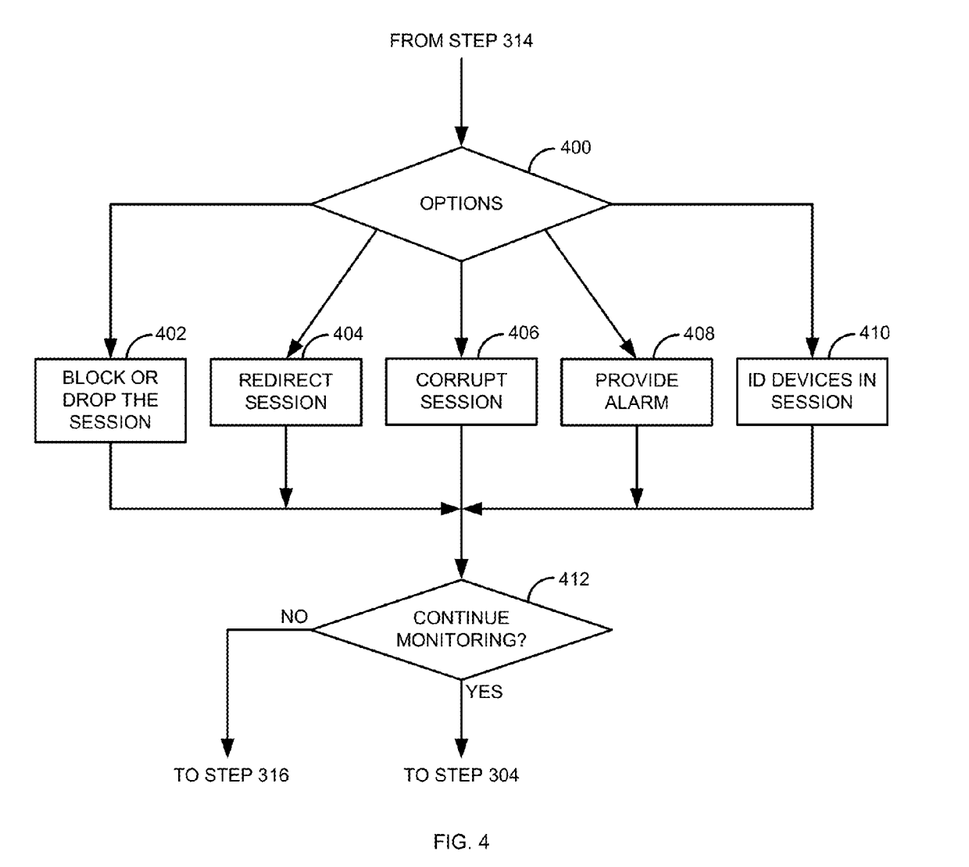
FIG. 4 is a flow diagram of a process for handling different options for a potential security threat.

FIG. 3 is a flow diagram of a process for exfiltration prevention. Illustratively, the communication devices 101A-101N, the security module 102, the watermark detector 103, the communication module 104, the communication system 120, the security module 122, the watermark detector 123, the communication module 124, the firewall 230, and the communication device 201 are stored-program-controlled entities, such as a computer or processor, which performs the method of FIGS. 3-4 and the processes described herein by executing program instructions stored in a tangible computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The process determines if a communication session has been initiated in step 302. If a communication session has not been initiated in step 302, the process repeats step 302. Otherwise, if a communication session has been initiated in step 302, the process monitors the communication session in step 304. The process determines in step 306 if the communication session contains the watermark. If the communication session does not contain the watermark in step 306, the process identifies the communication session as a potential security threat in step 314 and the process ends in step 316.

Otherwise, if the process determines in step 306 that communication session contains the watermark, the process may optionally remove the watermark in step 308. For example, the security module 122B can optionally remove the watermark from the communication session in step 308. Depending upon the type of watermark, this may be very useful because the watermark will not be observed on the network 210 (which is unsecure in this example). Thus, a hacker will not be able to determine that any kind of watermark is being used based on observing the communication session on the network 210.

The process determines in step 310 if the communication session is over. If the communication session is over in step 310, the process ends in step 316. If the process determines that the communication session is not over in step 310, the process determines in step 312 if additional monitoring is necessary. Additional monitoring may be necessary depending upon the type(s) of watermarks being used. For example, if a periodic water mark is being used (e.g., a watermark is sent every $50^{th}$ packet), then additional monitoring will be necessary. Likewise, if two or more watermarks are being used, the additional monitoring will be necessary to detect the additional watermarks. Alternatively, if only one instance of the water is used, additional monitoring will not be necessary. If additional monitoring is necessary in step 312, the process goes to step 304. Otherwise, if additional monitoring is not necessary in step 312, the process ends in step 316.

FIG. 4 is a flow diagram of a process for handling different options for a potential security threat. The process of FIG. 4 proceeds following execution of step 314 of FIG. 3. After the communication session has been identified as a potential security threat in step 314, the process determines in step 400 what option(s) to perform. What specific option(s) are performed in step 400 can vary based on implementation/administration. If the option for blocking or dropping the communication session is set in step 402, the process blocks (if the communication session has not been completely setup) or drops (if the communication session has been setup).

If the option to redirect the communication session has been set in step 404, the process redirects the communication session. The communication session can be redirected to another communication device for monitoring. For example, if the communication device 101A contained the malware, the communication session to the communication device 201 could be redirected (i.e., transferred or conferenced by the security module 122B of the firewall 230) to a communication device 101 that could record the data being transferred; this may allow security personnel try and determine the type of security breach.

If the option is to corrupt the communication session (e.g., corrupt the data of a media stream) the process corrupts the data of the communication session in step 406. For example, the security module 122B of the firewall 230 could corrupt the data in the media stream being sent to the communication device 201. In one embodiment, the data in the media stream is corrupted in a random manner. In another embodiment, the data in the media stream is corrupted in a known pattern.

If the option is to provide an alarm in step 408, an alarm is provided. The alarm can be provided to an administrator and/or one or more parties involved in the communication session.

If the option to identify communication devices involved in the communication session is set in step 410, the communication devices are identified and stored. This can be useful in identifying where the security breach occurred from (e.g., the IP address of the communication device 101/201).

For all the above options, various combinations can be implemented for the same communication session. For example, the communication session can be dropped (402), an alarm can be provided (408), and the devices in the communication session can be identified (410). In another embodiment, the communication session can be corrupted (406) and an alarm can be provided (408). In another embodiment, the communication session can be redirected (404) and the devices in the communication session can be identified (410). In another embodiment, the communication session can be blocked (402) and an alarm is provided (408).

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   monitoring, by a microprocessor, a communication session, wherein the communication session is a voice or a video communication session between a plurality of different communication devices;
   determining, by the microprocessor, if the communication session contains a watermark, wherein the watermark is used to identify that the voice or video communication session is a legitimate real-time voice or video conference call between a plurality of users using the plurality of different communication devices;
   in response to determining that the communication session contains the watermark, allowing, by the microprocessor, the communication session to continue; and
   in response to determining that the communication session does not contain the watermark, identifying, by the microprocessor, the communication session as a potential security breach.

2. The method of claim 1, wherein the watermark is inserted into a protocol header in the communication session.

3. The method of claim 1, wherein the monitored communication session comprises a plurality of monitored communication sessions and wherein the watermark is different for each of the plurality of monitored communication sessions.

4. The method of claim 1, wherein the watermark comprises a plurality of different watermarks and wherein a first one of the plurality of watermarks is inserted into a media stream of the communication session and a second one of the plurality of watermarks is inserted into a protocol header of a control channel of the communication session.

5. The method of claim 1, further comprising: in response to determining that the communication session contains the watermark, removing, by the processor, the watermark from the communication session for transmission outside a secure network.

6. The method of claim 1, wherein the communication session is a conference call between three or more communication devices and wherein each leg of the conference call uses a different watermark.

7. The method of claim 1, wherein the watermark is generated based on at least one of:
a number of packets sent in the communication session;
a number of packets received in the communication session;
a number of packet retransmissions;
a Cyclic Redundancy Check (CRC) of a previously received packet;
whether the communication session is voice or video;
a size or length of one or more packets sent in the communication session;
a defined packet size based on a packet number;
a hash of one or more portions of the communication session;
a prime number mapping to a hashing algorithm for every prime number packet;
a timing sequence that uses a time of day, week, and/or year of the start of the communication session;
a timing sequence that uses a time of day, week, and/or year of the start of the communication session, which creates a timestamp that is inserted into the communication session at a defined point based on one or more of the day, the week, or the year;
inserting a second watermark into the communication session at a defined time or packet;
inserting a second watermark into the communication session at a defined time or packet using a unique identifier or communication session identifier;
a Media Access Control (MAC) address of a sending device;
a hash of a time, a day, a week, a year;
a hash of a unique event of the communication session;
a hash of a time when each participant joined a conference, where the hash of the time when each participant joined the conference is used for the respective leg of the conference where the participant joined;
one or more of a release date and/or a patch level associated with a communication device or software;
a periodic timestamp inserted into the communication session;
a random pattern of watermarks;
a rotating pattern of watermarks;
where the watermark is different based on the direction of a sent or received packet;
an insertion of one or more predefined signatures at different time points or at different packets sequence numbers;
reorganizing content of a packet; or
removing information from one or more packets in a known pattern.

8. The method of claim 1, wherein identifying the communication session as a potential security breach further comprises at least one of the following:
providing an alarm;
blocking the communication session;
dropping the communication session;
corrupting data in the communication session;
redirecting the communication session; or
identifying one or more communication devices involved in the communication session.

9. A system comprising:
a microprocessor; and
a computer readable medium, coupled with the microprocessor and comprising microprocessor readable and executable instructions that cause the microprocessor to:
monitor a communication session between a plurality of different communication devices, wherein the communication session is a voice or a video communication session;
determine if the communication session contains the watermark;
allow the communication session to continue in response to determining that the communication session contains a watermark, wherein the watermark is used to identify that the voice or video communication session is a legitimate real-time voice or video conference call between a plurality of users using the plurality of different communication devices; and
identify the communication session as a potential security breach in response to determining that the communication does not contain the watermark.

10. The system of claim 9, wherein the watermark is inserted into a voice or video media stream of the communication session by replacing voice or video data with the watermark.

11. The system of claim 9, wherein the watermark comprises a plurality of different watermarks and wherein a first one of the plurality of watermarks is inserted into a media stream of the communication session and a second one of the plurality of watermarks is inserted into a protocol header of a control channel of the communication session.

12. The system of claim 9, further comprising a firewall that removes the watermark from the communication session for transmission outside a secure network in response to determining that the communication session contains the watermark.

13. The system of claim 9, wherein the communication session is recorded and wherein the watermark is used for copyright enforcement.

14. The system of claim 9, wherein the communication session is a conference call between three or more communication devices and wherein each leg of the conference call uses a different watermark.

15. The system of claim 9, wherein the watermark is generated based on at least one of:
a number of packets sent in the communication session;
a number of packets received in the communication session;
a number of packet retransmissions;
a Cyclic Redundancy Check (CRC) of a previously received packet;

whether the communication session is voice or video;
a size or length of one or more packets sent in the communication session;
a defined packet size based on a packet number;
a hash of one or more portions of the communication session;
a prime number mapping to a hashing algorithm for every prime number packet;
a timing sequence that uses a time of day, week, and/or year of the start of the communication session;
a timing sequence that uses a time of day, week, and/or year of the start of the communication session, which creates a timestamp that is inserted into the communication session at a defined point based on one or more of the day, the week, or the year;
inserting a second watermark into the communication session at a defined time or packet;
inserting a second watermark into the communication session at a defined time or packet using a unique identifier or communication session identifier;
a Media Access Control (MAC) address of a sending device;
a hash of a time, a day, a week, a year;
a hash of a unique event of the communication session;
a hash of a time when each participant joined a conference, where the hash of the time when each participant joined the conference is used for the respective leg of the conference where the participant joined;
one or more of a release date and/or a patch level associated with a communication device or software;
a periodic timestamp inserted into the communication session;
a random pattern of watermarks;
a rotating pattern of watermarks;
where the watermark is different based on the direction of a sent or received packet;
an insertion of one or more predefined signatures at different time points or at different packets sequence numbers;
reorganizing content of a packet; or
removing information from one or more packets in a known pattern.

16. The system of claim 9, wherein the communication session is identified as a potential security breach based on at least one of the following:
providing an alarm;
blocking the communication session;
dropping the communication session;
corrupting data in the communication session;
redirecting the communication session; or
identifying one or more communication devices involved in the communication session.

17. The system of claim 9, and wherein the watermark is generated based on at least one of:
a number of packets sent in the communication session;
a number of packets received in the communication session;
a number of packet retransmissions;
a size or length of one or more packets sent in the communication session; or
a defined packet size based on a packet number.

18. The system of claim 9, wherein the watermark is generated based on at least one of:
a hash of one or more portions of the communication session;
a prime number mapping to a hashing algorithm for every prime number packet;
a timing sequence that uses a time of day, week, and/or year of the start of the communication session;
a timing sequence that uses a time of day, week, and/or year of the start of the communication session, which creates a timestamp that is inserted into the communication session at a defined point based on one or more of the day, the week, or the year;
inserting a second watermark into the communication session at a defined time or packet using a unique identifier or communication session identifier; or
a Media Access Control (MAC) address of a sending device.

19. The system of claim 9, wherein the watermark is generated based on at least one of:
a hash of a unique event of the communication session;
a hash of a time when each participant joined a conference, where the hash of the time when each participant joined the conference is used for the respective leg of the conference where the participant joined;
one or more of a release date and/or a patch level associated with a communication device or software;
a periodic timestamp inserted into the communication session;
an insertion of one or more predefined signatures at different time points or at different packets sequence numbers; or
removing information from one or more packets in a known pattern.

20. A method of conducting a communication session, comprising:
establishing, by a microprocessor, a communication session between a first communication device and a second communication device; and
as part of the communication session, incorporating, by the microprocessor, at least one watermark into media transmitted by the first communication device toward the second communication device thereby enabling a watermark detector to determine that the communication session is a legitimate real-time voice or video conference call between a first user on the first communication device and a second user on the second communication device.

* * * * *